(12) United States Patent
Rhodes et al.

(10) Patent No.: US 11,754,473 B2
(45) Date of Patent: Sep. 12, 2023

(54) METHOD AND APPARATUS TO MANIPULATE BIOLOGICAL SECTIONS

(71) Applicant: 3Scan, Inc., San Francisco, CA (US)

(72) Inventors: Christopher Rhodes, San Francisco, CA (US); Cody Daniel, Alameda, CA (US); Joey Springer, San Francisco, CA (US); Kristy Parker, San Francisco, CA (US)

(73) Assignee: Strateos, Inc., Menlo Park, CA (US)

( * ) Notice: Subject to any disclaimer, the term of this patent is extended or adjusted under 35 U.S.C. 154(b) by 1051 days.

(21) Appl. No.: 16/367,141

(22) Filed: Mar. 27, 2019

(65) Prior Publication Data

US 2020/0041387 A1 Feb. 6, 2020

Related U.S. Application Data

(60) Provisional application No. 62/649,107, filed on Mar. 28, 2018.

(51) Int. Cl.
*G01N 1/06* (2006.01)
*G01N 1/30* (2006.01)

(52) U.S. Cl.
CPC ............... *G01N 1/06* (2013.01); *G01N 1/30* (2013.01)

(58) Field of Classification Search
None
See application file for complete search history.

(56) References Cited

U.S. PATENT DOCUMENTS

| 7,374,907 B1 | 5/2008 | Voneiff et al. |
| 8,162,957 B2 | 4/2012 | Mishra et al. |
| 10,704,992 B2 * | 7/2020 | Hayworth ............... G01N 1/06 |
| 2007/0039435 A1 * | 2/2007 | Kokubo .................. G01N 1/06 83/13 |
| 2017/0003309 A1 | 1/2017 | Mitra et al. |
| 2017/0191906 A1 | 7/2017 | Shibata et al. |

FOREIGN PATENT DOCUMENTS

| JP | S58153584 U | 10/1983 |
| JP | H04177143 A | 6/1992 |
| JP | H09329534 A | 12/1997 |
| JP | 2001502430 A | 2/2001 |
| JP | 2007057255 A | 3/2007 |
| JP | 4510908 B2 | 7/2010 |
| JP | 2017187409 A | 10/2017 |

OTHER PUBLICATIONS

Cuisinart Product Description. Kitchen Pro Food Slicer. Date: Jul. 2, 2016. (Year: 2016).*
World Intellectual Property Organization, Application No. PCT/US19/24658, International Search Report dated Aug. 9, 2019.
Canada Patent Office, Application No. 3,094,128, Foreign Office Action dated Sep. 27, 2021.
European Patent Office, Application No. 19778395.4, European Search Report dated Nov. 26, 2021.
Japanese Patent Office, Application No. 2021-502720, Foreign Office Action dated Nov. 24, 2021.

* cited by examiner

*Primary Examiner* — Nghi V Nguyen
(74) *Attorney, Agent, or Firm* — Shield Intellectual Property PC; Kirk D. Wong

(57) ABSTRACT

An automated tissue section slicing, staining, and imaging system sequentially adheres tissue sections to a continuous substrate such that the staining, imaging, and interpretation of the tissue sections are readily carried out at high speed under machine control.

11 Claims, 15 Drawing Sheets

Fig. 1 - overall method

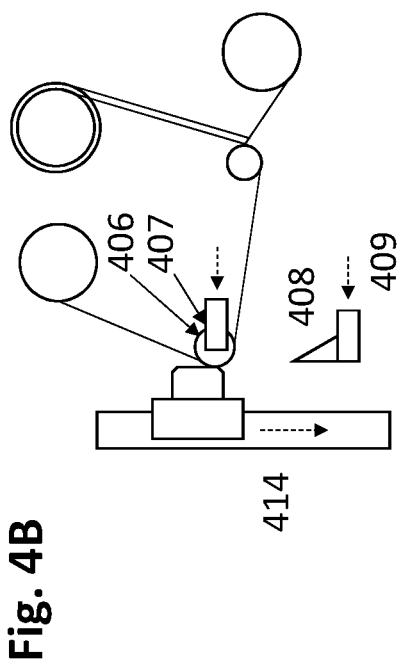
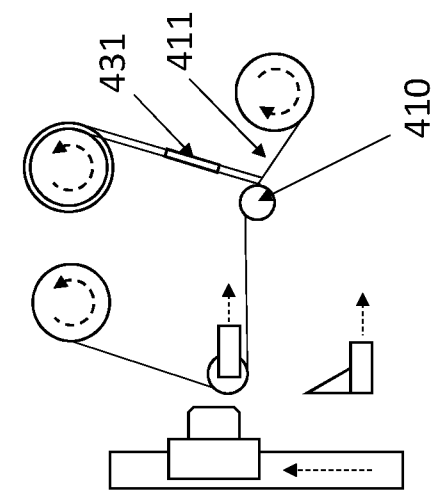
Fig. 4B
Fig. 4D
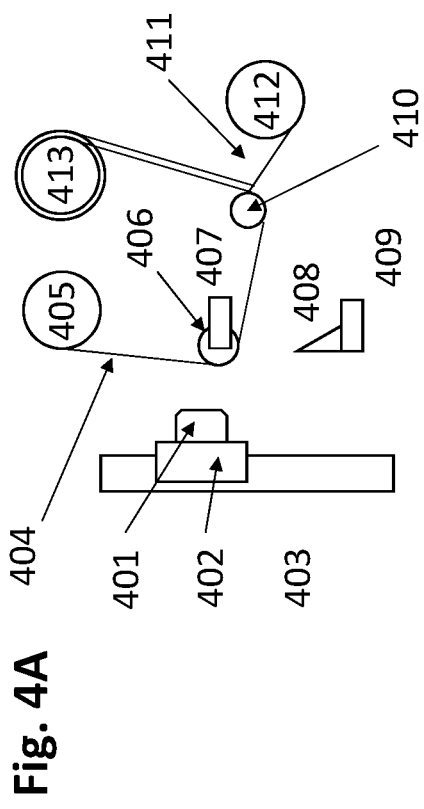
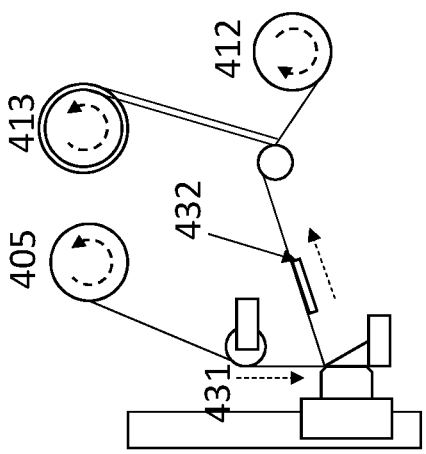
Fig. 4A
Fig. 4C

METHOD AND APPARATUS TO MANIPULATE BIOLOGICAL SECTIONS

PRIORITY CLAIM

This application claims benefit of Provisional Application No. 62/649,107, filed Mar. 28, 2018, the entire contents of which is hereby incorporated by reference as if fully set forth herein, under 35 U.S.C. § 119(e).

TECHNOLOGY

The present invention relates generally to the slicing, staining, and imaging of biological tissues.

BACKGROUND

Recent advances in nucleic acid sequencing, gene transcription profiling, protein expression analysis, and super resolution microscopy offer great promise to understand the biology of tissues and organs at unprecedented single-cell detail. But while widely reported in carefully controlled biological systems, applying these methodologies to entire tissues and organs is difficult.

Slicing, staining, and imaging sections of tissue is a routine practice in medicine and biological research. But many single-cell techniques would be prohibitively slow and expensive if applied uniformly to each slice in a volume of tissue.

Practitioners typically generate and transfer thin tissue sections onto individual glass slides by hand. They then inspect individual slides and decide how to proceed with subsequent staining, microscopy, and analysis steps. These processes are labor-intensive and frequently damage tissue sections. Tools exist to automate many of these steps individually. But, unlike human practitioners, automation tools do not adapt each step to the unique traits of individual sections.

Because of this decision process, investigators typically make important diagnostic and scientific conclusions based on sections that represent only a small sampling of tissue. Furthermore, manual handling often disrupts the quality of sections and their spatial relationships with each other, hindering the three-dimensional representation of microscope images. Together, these issues significantly limit the understanding of the relationship between molecular and geometric features in tissue pathology.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF DRAWINGS

The present invention is illustrated by way of example, and not by way of limitation, in the figures of the accompanying drawings and in which like reference numerals refer to similar elements and in which:

FIG. 3A illustrates a substrate comprising a film assembly, FIG. 3B illustrates a substrate having a port layer, FIG. 3C illustrates a spacer layer of a substrate, according to an embodiment of the invention;

FIGS. 4A-H illustrate apparatuses that create and capture sections, where FIG. 4A illustrates an apparatus that creates and captures sections, FIGS. 4B-4D illustrate phases of a creation and capture motion sequence, FIG. 4E illustrates a feed roll, FIG. 4F illustrates an applicator, FIG. 4G illustrates a surface winder, FIG. 4H illustrates a sample block holder, according to an embodiment of the invention;

FIG. 5A illustrates an apparatus for staining sections, FIGS. 5B-5D illustrate a sequence of staining sections using the apparatus, according to an embodiment of the invention;

FIG. 8A illustrates a n imaging instrument, FIG. 8B illustrates a staining and imaging instrument, FIG. 8C illustrates a pre-imaging synchronized with the handling of the substrate, according to an embodiment of the invention;

FIG. 9A illustrates a perspective view of the section staining apparatus, FIG. 9B illustrates a front view of the section staining apparatus, FIG. 9C illustrates a substrate tensioner, according to an embodiment of the invention;

FIG. 10A illustrates an exploded view of the substrate configuration, FIG. 10B illustrates an assembled view of the substrate configuration, according to an embodiment of the invention.

DESCRIPTION OF EXAMPLE EMBODIMENTS

Figure 1:
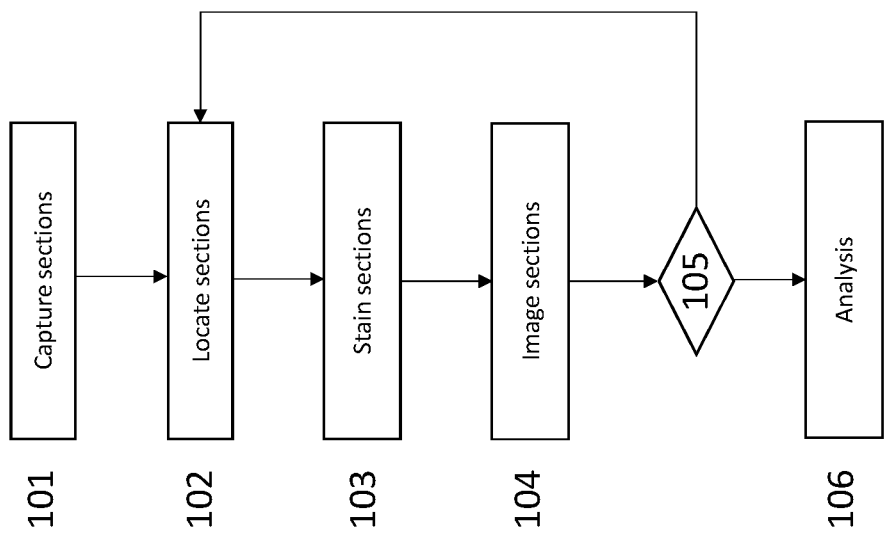
FIG. 1 illustrates a flow chart describing automating the staining and imaging of tissue sections, according to an embodiment of the invention.

In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Example embodiments are described herein according to the following outline:

1.0. Functional Overview
   2.0. Example Scenarios
   3.0. Extensions and Alternatives

1.0 Functional Overview

In an embodiment, an apparatus and method for automating the slicing, staining, and imaging of tissue sections is provided. An instrument first sequentially adheres tissue sections to a continuous substrate. This renders many or all sections in a tissue specimen highly amenable to later steps in the system, namely automatic staining, imaging, and interpretation, such that these steps are readily carried out at high speed under machine control. Decision points in this method incorporate images of a section to inform subsequent staining, imaging, and sorting procedures for that section.

Definitions

"Block" refers to a volume of solid material to be analyzed, such as a region of biological tissue, manufactured synthetic tissue, or synthetic solid material. The entire block itself may represent a specimen for analysis, or the block may contain the specimen in an embedding medium.

"Face" refers to an exposed surface of the block, specifically a smooth face intended for sectioning with a knife.

"Section" refers to least one thin piece of the block produced by a cutting process.

"Positioner" refers to a mechanical element that supports and guides motion along a known path. A positioner may enable free motion or may include motors or actuators to cause motion along the known path in response to signals from a human operator or electronic controller.

"Staining" refers generally to one or more steps of chemical treatment intended to confer contrast on images of a section, such as by applying histologic stains, immunohistochemistry, or hybridization probes. It may also refer to processes related peripherally to these techniques, such as rinsing, blocking, releasing antigen, destaining, or preserving tissue, or to skipping a step entirely if so intended for individual sections. Staining visual contrast agents may include chromogenic, fluorescent, or mass spec probes.

"Imaging" refers to methods that provide visual information about a section, block, or collection thereof. Imaging includes but is not limited to: motion-capture photography, brightfield optical microscopy, fluorescence microscopy, electron microscopy, or focused-ion beam microscopy.

"Substrate" refers to a material with one or more faces that constrains the movement of a section. Substrates may be flexible, such as a polymer film, etc., or rigid, such as a glass slide, etc.

"Molecular analysis" refers to methods that reveal more information about the biological or chemical composition of a section, including, but not limited to: mass spectrometry, analytical chromatography, gel electrophoresis, Western blotting, immunoassays, flow cytometry, nucleic acid sequencing, nucleic acid hybridization, and related techniques. Molecular analysis also includes but is not limited to: means of conferring image contrast, including staining, etc., where the features of interest correspond to specific biological or chemical markers, such as fluorescence immunostaining and hybridization.

"Reagent" refers to liquids or gases that are necessary to perform cleaning, staining, molecular analysis, or other procedures pertinent to the preparation of biological material. Reagents include but are not limited to: air, nitrogen, water, buffers, staining solutions, organic solvents, blocking proteins, affinity probes such as antibodies, enzymes, mixtures or suspensions thereof.

Referring to FIG. 1, a sequence of steps for automating the staining, and imaging of tissue sections in an embodiment is illustrated. In a first step 101, sections of a previously prepared block are captured onto a substrate. After capturing a series of sections, individual sections are then located on the substrate 102, stained 103, and imaged 104.

Optionally, a decision process 105 may prescribe repeating the location, staining, and imaging steps under the same or different conditions, such that each section may be uniquely prepared. When complete, a section or series of sections may be reserved for additional analysis steps.

The decision process 105 may be an interface to a human operator, a computational algorithm, or a hybrid of the two. The process may be informed by images of one or more stains, predetermined settings such as provided by a human operator, sensors and controls from machinery used to automate these steps, or a combination of these. It may prescribe repeating staining and imaging steps so as to improve these steps' yield or quality. Alternatively, it may apply different staining or imaging steps, for example to alter feature identification, contrast, or magnification in microscope steps. The decision process may additionally use the image, sensor, and other information to identify sections for analysis independent of its function to repeat staining and imaging steps. In this way, the decision process serves as a filter that sorts sections based on suitability for one or more subsequent steps, including molecular analysis, destruction, and archiving.

Figure 2:
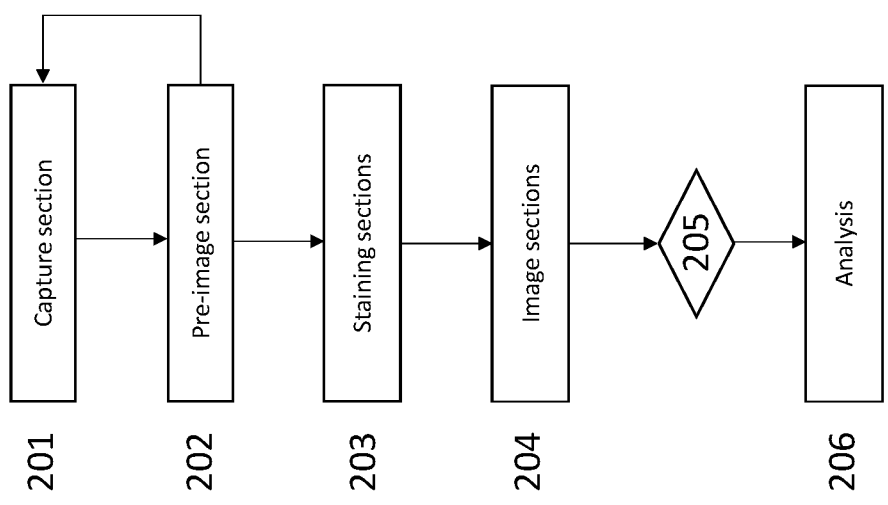
FIG. 2 illustrates a flow chart describing automating the staining and imaging of tissue sections having a pre-imaging section, according to an embodiment of the invention.

FIG. 2 illustrates an embodiment having a pre-imaging section. The method starts with a repeating process comprising section capture (201) and pre-imaging (202) steps. Data from the pre-imaging step inform subsequent staining (203) and imaging (204) steps. As in the method of FIG. 1, a decision process (205) identifies sections for molecular analysis. For example, data from the pre-imaging step may be used to identify different types of tissue morphology in different sections. The staining step may then apply different staining protocols according to these types of tissue morphology. Or the imaging step may occur at different magnification levels depending on tissue morphology type. Alternatively, parameters of the sectioning process, such as slicing speed and thickness, may incorporate information from the pre-imaging step.

Further embodiments may incorporate elements of the method of both FIG. 1 and FIG. 2, for example, by carrying out staining, imaging, and analysis steps based on information from both pre-imaging and main imaging steps.

In an embodiment, the methods of FIG. 1 and FIG. 2 are carried out by computer control. Positioners move components in the capture step, and transport sections between steps. Each positioner receives a signal from a driver and controller, which receive their signals from a central computer or cluster of computers. Similarly, valves and sensors for other aspects of method automation also connect, optionally via drivers and controllers, to a computer or cluster. The imaging and pre-imaging steps are implemented with one or more digital cameras. The computer or cluster apply algorithms to analyze the data from these digital cameras and use the outcome of these algorithms to direct subsequent staining, imaging, and analysis steps.

Figure 3C:
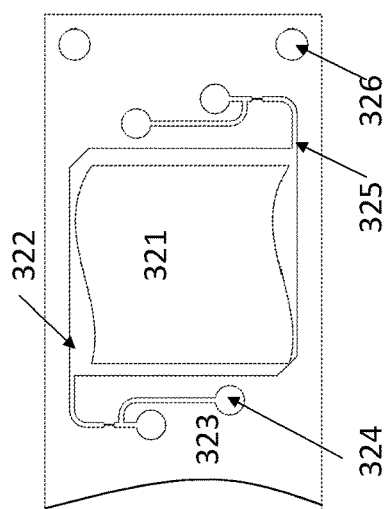
FIGS. 3A-C illustrate configurations by which a captured section is organized on its substrate, where
Figure 3B:
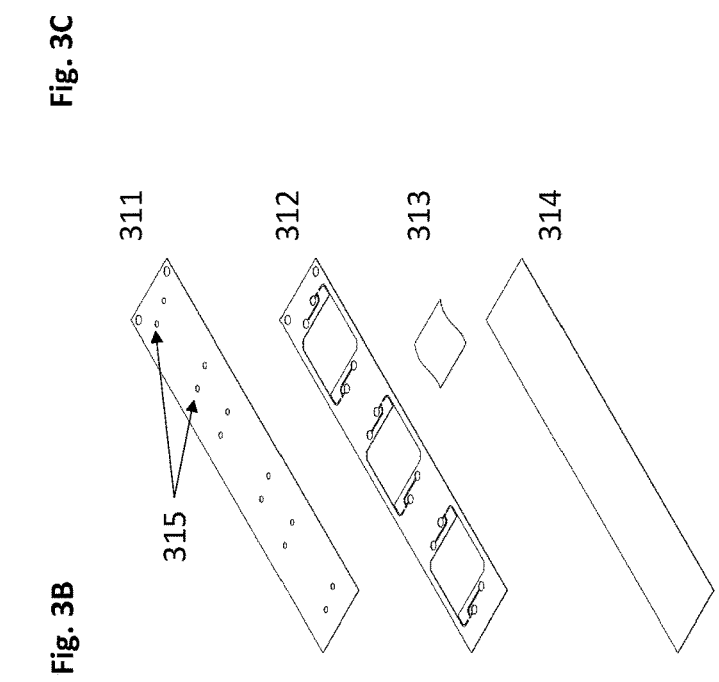
Figure 3A:
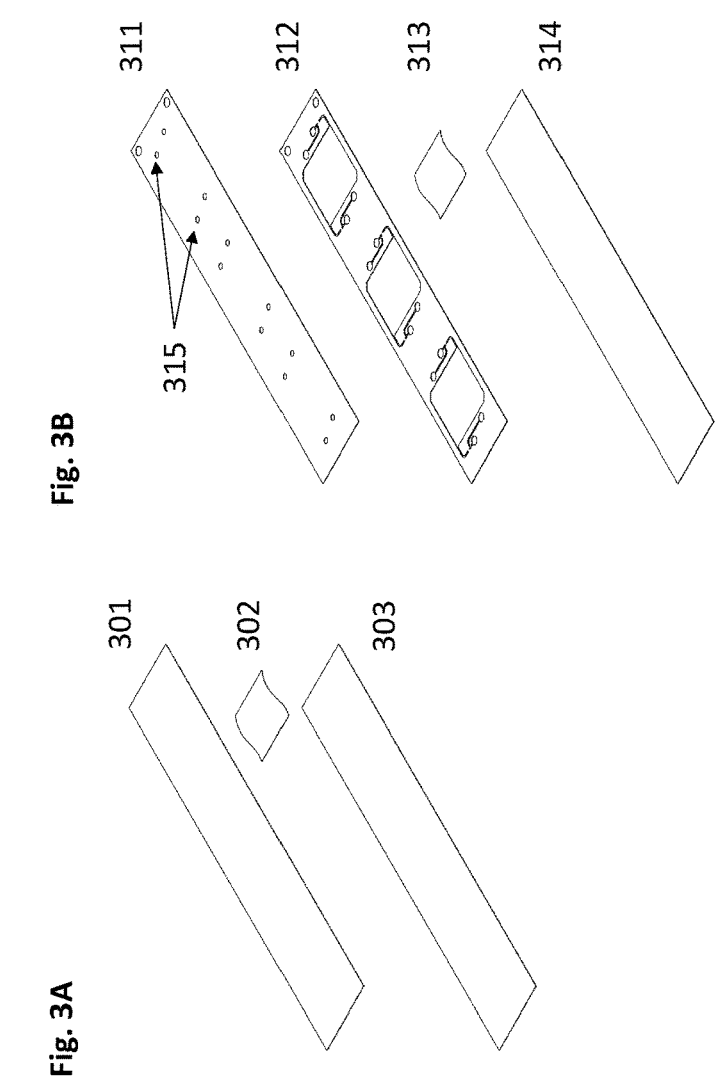

FIGS. 3A-C illustrate configurations by which a captured section is organized on its substrate. They may represent a repeating unit of each component, such that the method of the invention uses many such repeating units in series.

FIG. 3A illustrates a substrate, comprising a film assembly that protects one or more captured sections in sequence. In coordination with the process of cutting a block, a capture film (303) adheres to the section (302). Following this, a protective film (301) adheres to the assembled capture film and section. The adhesion between these two pairs of films may further comprise a fluid seal that blocks or otherwise regulates the transport of fluids to the capture section.

In an embodiment, the substrate is a tape comprising one or more layers, one face of which is an exposed adhesive. In this embodiment, the slicing instrument first adheres the film's adhesive face to the exposed tissue face, activating adhesion by methods including but not limited to: applying pressure, applying heat, illuminating the adhesive with ultraviolet light, and combinations of these. Suitable tapes include but are not limited to: acrylic adhesives on polyvinyl chloride carrier films (such as 3M Scotch 600), silicone or acrylic transfer adhesives laminated to polyester terephthalate carriers, or chemical-resistant tapes coated with silicone adhesive (DuPont Kapton and Teflon FEP tapes).

In an alternative embodiment, the substrate attaches to the exposed tissue face by chemical means other than conventional adhesives films. The substrate may be pretreated with non-adhesive films that encourage its adhesion to the tissue, including waxes, acrylic polymer resins, liquid lubricant films such as organic oils, silicone oils, hydrogels; as well as surfactants and other chemicals that promote adhesion. Adhesion may also be achieved by locally melting the tissue's embedding medium with applied heat, light, radiation, pressure, or combinations of these.

For example, the substrate may be first coated with a low melting-point paraffin wax, then placed in contact with the exposed face of the block. An adjacent heater then melts the wax coating, which when cooled creates adhesion between the substrate and the block.

In an alternative embodiment, adhesion may be achieved by means of electrostatic attraction or electroadhesion. The substrate may contain conductive or dielectric thin films that promote adhesion. The apparatus may use electrodes, static generators, corona discharge elements or other components to create conditions for electrostatic attraction. The apparatus may also include features to control humidity, particles, and ambient gases that create a favorable environment for electrostatic adhesion.

In an alternative embodiment, adhesion may be achieved by magnetism. The block, substrate, or both may include magnetic materials, such that magnetic attraction between the section and substrate promotes their adhesion. The apparatus may include additional components such as electromagnets, regulators, and shielding to assist in this method.

FIG. 3B illustrates an alternative film assembly that protects one or more captured sections in sequence. A port layer (311) seals against a spacer layer (312). The combination of port and spacer layers then seals against the capture layer (314), entrapping one or more sections (313). Once the assembly is sealed, fluidic access to captured sections then only possible via ports (315).

FIG. 3C illustrates in greater detail features in the spacer or other layers, whose purpose is to allow fluidic manipulation of captured sections. The section (321) occupies a chamber (322) defined by at least the spacer layer (312) of the film assembly. One or more networks of fluidic features (323), comprising at least one interconnect (324) and one channel (325), guide fluid flow between the ports (315) in the port layer (311) and the chamber. Alignment features (326), such as dowel holes or printed marks, may also be included for purposes of guiding parts of the film assembly during sealing or handling.

FIG. 4A describes an apparatus for the process of creating and capturing sections. The block (401) is attached to a positioner (402), in turn supported by a rigid base (403). A second positioner (407) supports an applicator (406), while a third slide (409) supports a knife (408). A first roll (405) couples to a shaft and releases the capture film (404). A second roll (412), also coupled to a shaft, deposits a protective film or films (411) that eventually attach to the capture film via a joining roller (410). These protective films may, for example, consist of the assembled microfluidic port (301) and spacer (302) layers of the assembly in FIG. 3A. A third roll (413), also attached to a shaft, is a take-up roll that collects the assembled films.

In an embodiment, the slicing instrument moves the block (401) past a sharp knife (408). Either the block (401) or knife (408) may be stationary, or both may move such that their relative motion determines the speed of slicing.

In an embodiment of the invention, positioners (402, 407, 409) each comprise a stationary guide, a moving platform, and a linear actuator. The linear actuators may be linear motors, rotary motors coupled to transmission screws, solenoids, voice coil actuators, or pneumatic pistons. Alternatively, the motion of one or more positioners may be nonlinear, such as rotary solenoids, or indirectly linked to an actuator, such as by a cam or linkage transmission. Two or more positioners may be combined, for example by using one positioner to move multiple components in the same direction, or in different directions by way of a multi-axis positioning stage.

FIGS. 4B-D illustrate a sequence of motion phase that relate to the capture of sections onto the substrate film. Each phase comprises numerous steps, which for purposes of illustration appear simultaneously; however, steps may also progress in a different order than illustrated.

FIG. 4B illustrates the initial phase of a section capture cycle. The applicator (406) and knife (408) advance toward the tissue block (401) via their motion in their respective slides (407, 409). This places the applicator and hence capture film (404) close to the path of the of the face of the tissue block (401), such that the advancing motion of the tissue block (414) serves to adhere the capture film to specimen face.

FIG. 4C illustrates the adhesion and capture phase. Because the capture film is adhered to the specimen face, the motion (431) of the block pulls the capture film away from the applicator. When the knife contacts the block, it cuts beneath the specimen-film interface, such that the capture film liberates a section (432) from the block. Rotation of the three film rolls (405, 412, 413) move this section away from the knife and ultimately toward the joining roll (410).

FIG. 4D illustrates a final phase of the section capture process. Positioners (407, 409) return the applicator (406) and knife (408) to their initial positions. Separately, capture and protective films (411) assemble at the joining roller (410), enclosing the captured section (431) between them.

One or more electronic controllers may coordinate the movement of actuators necessary to carry out this sequence of steps, in an open-loop manner, or closed-loop with the help of encoders, speed, or position sensors. Rollers (405, 412, 413) may be attached to motors, clutches, brakes, gears, pulleys, or other power transmission components that enable coordinated motion between their axes of rotation.

Figure 4E:
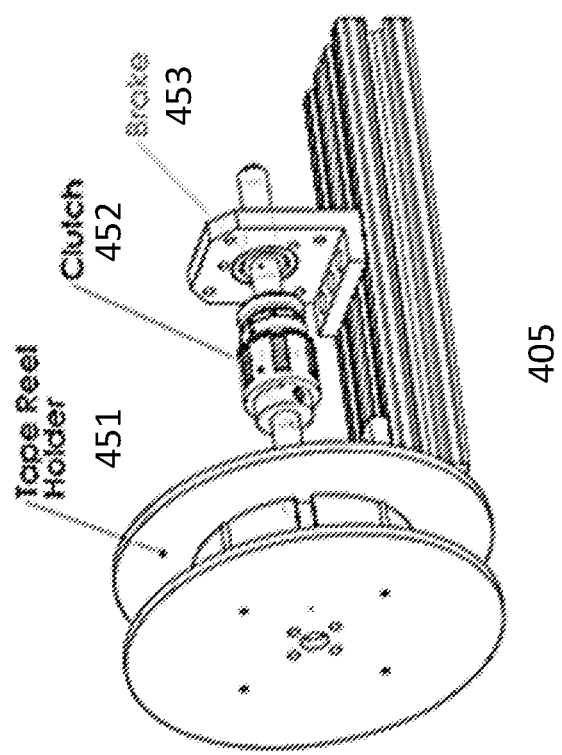

FIG. 4E illustrates a first roll (405) which may be called a feed roll. One or more feed rolls for dispensing tape may be used to enable the exchange of rolls. A feed roll (405) may comprise a tape reel holder (451) allowing exchange of rolls, a shaft and bearing allowing the feed of the tape or laminate, and a clutched brake (452, 453) to allow a specific drag torque to be set for the feed roll (450), thereby regulating the tension of the feed roll.

Figure 4F:
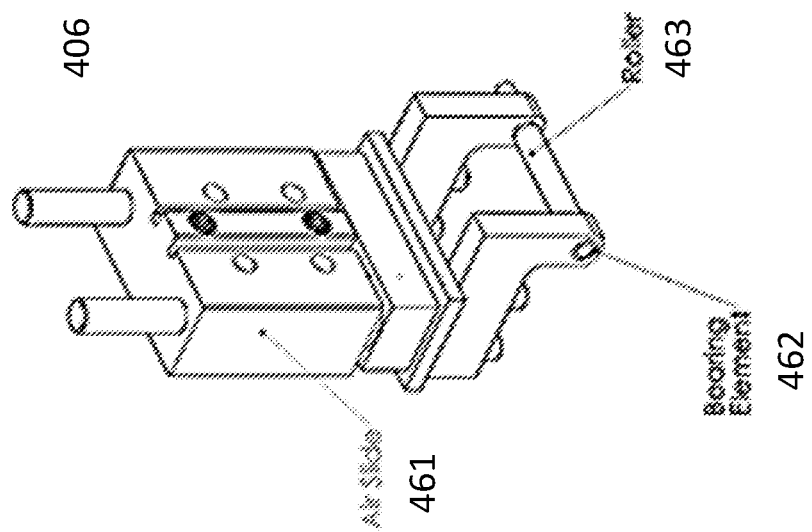

FIG. 4F illustrates an applicator (406). An applicator (406) may comprise a linear force spring such as an air piston, a linear slide (461), an applicator roller of a specific compliance (463), and a shaft on bearings (462) to allow free rolling of the applicator.

Figure 4G:
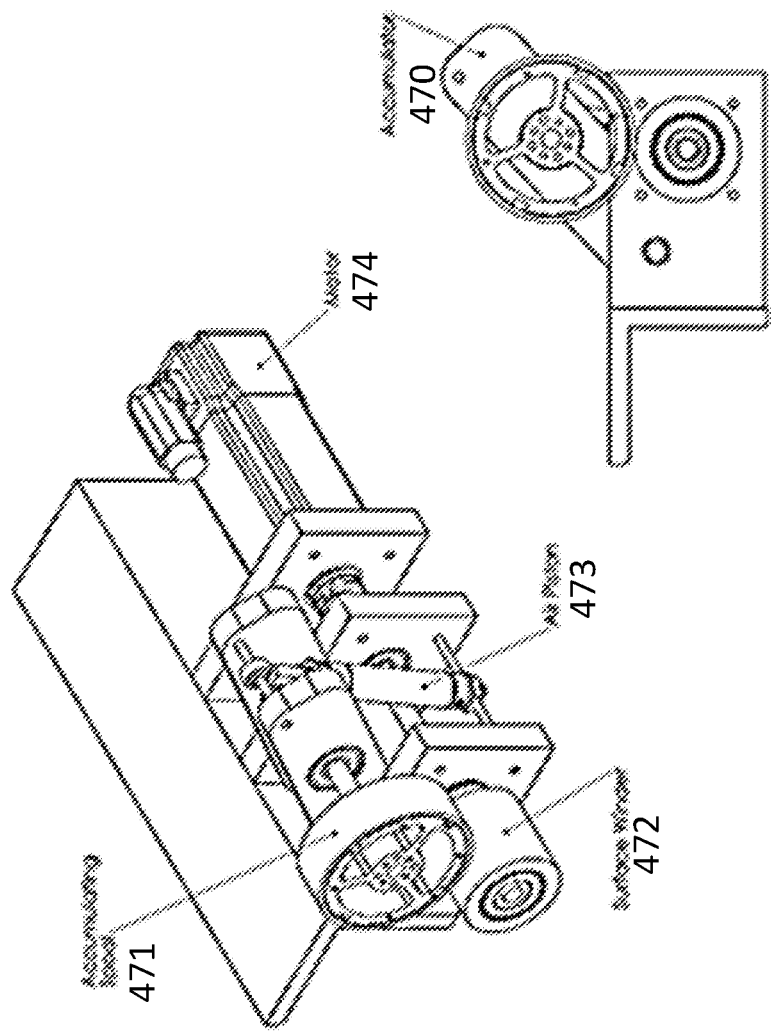

FIG. 4G illustrates a third roll (413) which may be called a surface winder. A surface winder (413) may comprise an assembly of an accumulating spool (471) on a rotary shaft, a surface winding roller (472) on a rotary shaft driven by a motor (474), a mechanism to allow the accumulating spool to grow in diameter on the surface winder (470), and a linear force preload mechanism such as an air piston (473). This assembly allows a variety of control schemes to be used to advance the tapeline, such as tension and position control, while ignoring effects of the changing diameter of the spool. Further, careful preload allows smooth winding and minimal section damage.

Figure 4H:
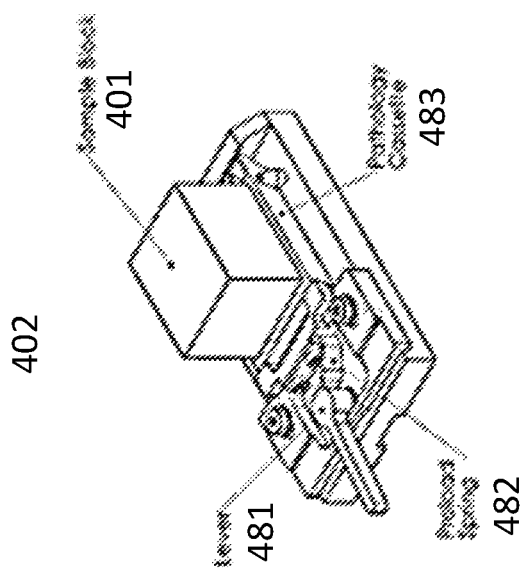

FIG. 4H illustrates a positioner (402) which may be called a sample block holder. A sample block holder (402) may comprise a small locking clamp capable of securing blocks mounted on pathology cassettes (483) or other standardized sample holders; a simple linear slide, a pre-load spring (482), and an actuating lever (481) may be used to load and unload samples.

Section Capture Control Sequence

Figure 11:
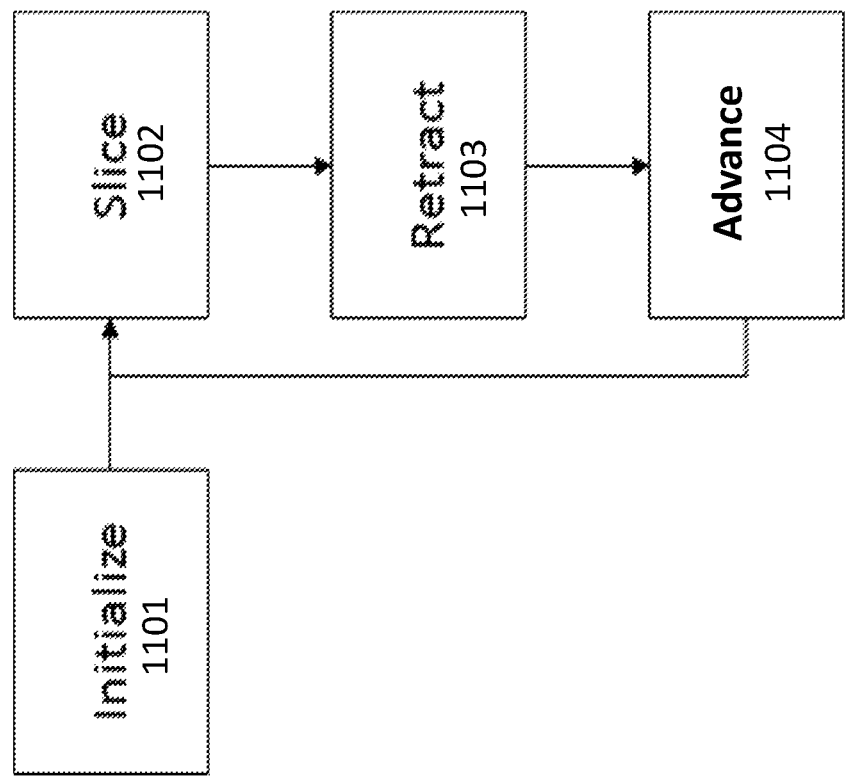
FIG. 11 illustrates a flowchart describing a capture cycle, according to an embodiment of the invention.

Referring to FIG. 11, a capture cycle consists of an initialization state (1101), a slice state (1102), a retract state (1103), and an advance state (1104). Each state may control either the position and/or the tension in the tape. Position control is used to achieve consistent inter-section distance for convenient handling and recall. Tension control is used to prevent delamination of tape from the block face and to minimize distortion and stretch in the captured sections. Alternating between position and tension control modes at these distinct states of the control cycle can enable fast and consistent collection of sections.

An initialization state (1101) can remove all slack from the tapeline and establish a threshold tension appropriate to begin lamination of tape on the block face. At such point, the control can move all components into a starting point and zero all position values to proceed to the next state.

A slice state (1102) can switch to a tension control mode to ensure that the tapeline advances with the sample block, preventing slack from interrupting sectioning or over-tension from destabilizing the adhesion of tape to the block face. The slice state may then command the block to move through a tape applicator and a subsequent microtome (knife), producing a section on tape. Once past the knife edge, the control can proceed to the next state.

A retract state (1103) can use tension control to keep slack from accumulating on the tapeline while the knife and laminator retract from the block surface, and the block retreats to its initial position. Once the block is in its initial position, the control can proceed to the next state.

An advance state (1104) can use position control to advance the tapeline to the next periodic spacing of sections on the tapeline. Once the tapeline is set to a specific point, the control can proceed to the next state.

This control scheme mitigates unintended cutting of tape by the microtome, stretching of the tape, or misplacement of sections along the total tape length.

Tape Assembly

Transparency, chemical compatibility, mechanical stability, and adhesion to paraffin are crucial properties of the capture film (404). Tapes that are too mechanically compliant, e.g. FEP tape, stretch during the sectioning process and make it difficult to use encoders for position feedback. Some tapes with silicone adhesive that feature high chemical stability, such as Kapton polyimide tapes, adhere well to paraffin but are strongly colored, hurting the ability to image in later steps. Polyester substrates perform well but generally do not laminate cleanly to silicone adhesives, leading to nonuniform adhesive coverage or overall poor adhesion to paraffin such as with CS Hyde clear polyester tape products. However, some polyester tapes do achieve uniform coverage of silicone adhesive that bonds strongly to paraffin, such as 3M 8911.

As captured sections are collected on the take-up roller, exposed adhesive can stick adjacent windings of tape to each other. This makes tape handling difficult and risks damaging captured sections and the tape itself. To prevent this, a protective film (411) is selected that comprises a transparent release liner treated with a non-silicone fluoropolymer coating on one face, such as 3M 5932. The liner's coated face is wound together with the capture film's adhesive face, which prevents tape self-adhesive and protects captured sections for subsequent steps. The liner is then removed prior to staining, using light mechanical tension or with a dedicated de-covering roller machine. The same length of protective film, or a new length of the same film type, may be re-wound with the capture film at any point in downstream processing to protect or preserve tissue.

Tape Routing and Active Slack Control

It is important to precisely control the direction and tension of tape on both sides of the laminated block face. If tension is too high or angle is too high relative to the block face, tape adhesion to the block face can destabilize. This may result in wrinkles, dangling sections, or skipped sections. If tension is too low or angle too low relative to the block face, the tape may accumulate excessive slack and stick to itself or components of the tape capture apparatus. Excessive slack may also accumulate in the tape shortly before it reaches the knife, which then fouls the knife and potentially severs the tape. As the laminated block face translates during the cutting cycle, ideal tape tension and angle generally change dynamically throughout the cycle.

One control strategy is to place one or more undriven rollers close to the knife edge to direct tape along a defined path. This reduces the angle at which the leading edge of the capture film travels immediately after being sliced, providing enough tension to keep the tape on the leading edge of the block from being cut, but not so much as to destabilize adhesion. Rollers comprise brass or plastic bushings on a stationary shaft, or cylindrical hubs on a shaft supported by bearings. Shafts may be supported by a machined or 3D printed mount that attaches to the same assembly that supports the knife, such that the same tape path is preserved relative to the knife as the overall knife position changes.

Another strategy is to create a small amount of slack in the take-up tape path, e.g., the length of tape that collects sections after cutting. This comprises an intentional delay or speed mismatch between the take-up roller's rotation relative to other tape rotational axes or the translation of the block itself. This is achieved, for example, by setting a virtual gear ratio between combinations of these axes in a computer motion control environment, such as Beckhoff TwinCAT, numerical control interfaces, etc. For example, the take-up spool axis and cutting are geared together so that the take-up axis moves slightly slower than the block moving axis, sustaining 5 mm or less of tape slack on the leading edge of the block face. Encoders on both the take-up spool axis, and slicing axis are used to provide position feedback, allowing the gear ratio to update for every slicing cycle.

Passive Slack and Tension Control

Because tension, direction, and slack change dynamically during the cutting cycle, constant tension can prematurely delaminate the tape from the block face. Active strategies such as computer numeric control are effective when properly tuned but may require frequent recalibration. Thus, passive mechanisms that achieve non-constant tape tension are desirable for sustained operation.

Orientating the slicing axis vertically is one way to passively control tape direction and tension. By laminating and capturing paraffin slices in a vertical motion, the gravity force on the tape itself is used to manage the leading edge slack instead of applied tension. In this scheme, a downward slicing motion introduces a slight amount of slack on the take-up end of the block that prevents tension-induced destabilization of adhesion.

Gravity-assisted passive slack control is more effective with an undriven dancer arm, comprising a pivot axis and a tape roller that rotates freely. The dancer arm is configured to rest gently on the take-up section of tape, and to use only its own weight to apply force to the tape, keeping slight tension in the system at all times. This ensures that the capture film does not stick to components of the apparatus. It also further simplifies the motor specifications, such that the take-up reel can simply use a motor that spins at constant velocity while a tunable inline clutch sets tape tension. The clutch normally slips except when the cutting stroke creates slack, providing control of section spacing and preventing excessive tension on the interface of adhesive and block face.

Furthermore, this scheme simplifies the control of tape at the start of the tape path. The tape supply reel can be implemented with only a tunable brake or clutch, keeping tension in the web without requiring a motor to constantly back drive the spool of tape. When properly tuned, the motion of the laminated block face overcomes the slight difference in tension between take-out and take-up paths: the take-out brake slips while the take-up clutch engages, but only until the resultant slack is collected on the take-up reel.

Applicator and Knife Assembly Design

An applicator assembly applies tape to the block face, moving back and forth each cycle to allow the block to return back to its starting position. The applicator may advance and retract by command from a computer controller, with optional feedback from a motor encoder. Where the tape capture apparatus mates with a standalone microtome, applicator actuation may also be timed based on the rotary position of the microtome's flywheel. This may be implemented with a numerical motion controller with rotary encoder feedback coupled to the flywheel, or by switches positioned at precise locations along the flywheel's path.

Embedding media and tissue are typically soft, so excessive application force combined with a hard applicator can damage tissue or propagate machinery vibrations into the block. An applicator roller with a soft sheath such at 35 A durometer silicone rubber is desirable, although other materials such as neoprene and hardnesses up to 60 A durometer may be beneficial in certain designs. A pneumatic piston applies a tunable application force of 15-130 N.

Positioning the application roller within 15 mm of the knife edge reduces the distance between captured slices, maximizing the number of samples that can be captured on a length of tape and hence increasing process throughput.

In certain embodiments, the slicing instrument of FIG. 4A is a microtome. In this embodiment, an operator may readily configure the microtome to include or exclude the apparatus of this invention. Such an apparatus is illustrated in FIGS. 9A-B. The apparatus contains attachment points to align with the specimen holder (901) of a microtome. In addition to the features of the instrument described in FIG. 4A, the instrument contains one or more rollers (911) that guide the tape path, and one or more tension control components (912). Alternatively, the slicing instruments may attach to a knife edge scanning microscope (KESM), or similar instrument that performs both sectioning and imaging functions.

Figure 9C:
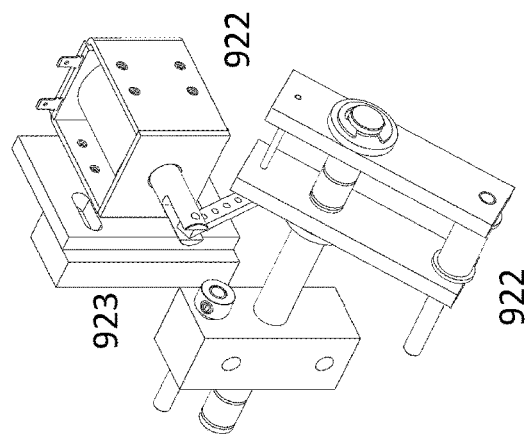
FIGS. 9A-C illustrate an apparatus using a microtome for staining sections, where
Figure 9B:
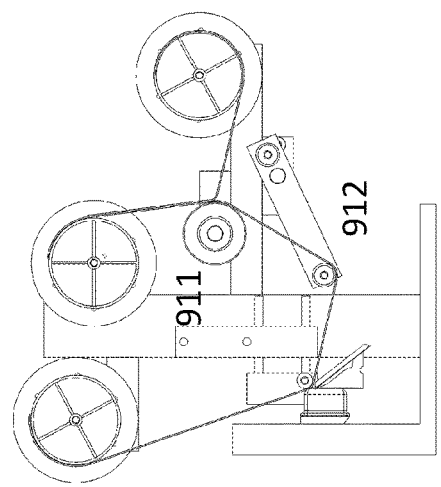
Figure 9A:
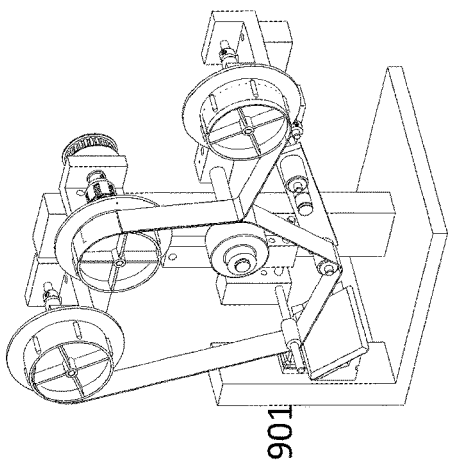

FIG. 9C provides additional detail on a critical component of the section capture system of FIG. 4A, which creates adhesion between the substrate and block. The substrate film wraps around a roller (922), where it contacts the block. A positioner (922) applies a force to the roller via one or more mounting components (923), such that the application force may be controlled. Application force may be varied by means of voltage, current, pulse cycle to electric actuators, or by pressure for pneumatic actuators, depending on the precise design of the positioner. The application force may be held constant for many cycles of sectioning or modulated in response to sensor signals. The applicator may also be retracted once per cycle, such that it does not interfere with backward motion of the block, by means of reversing the actuator's direction, or disengaging the actuator in the presence of a return spring.

Section Staining

Figure 5B:
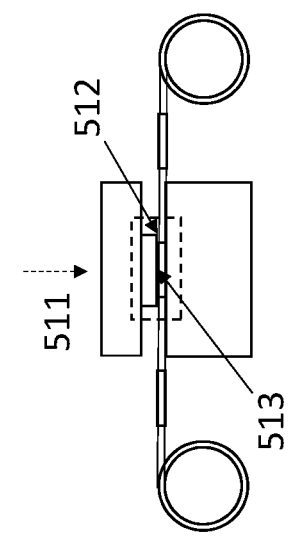
FIGS. 5A-D illustrate an apparatus for staining sections, where
Figure 5D:
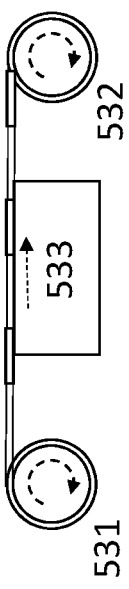
Figure 5A:
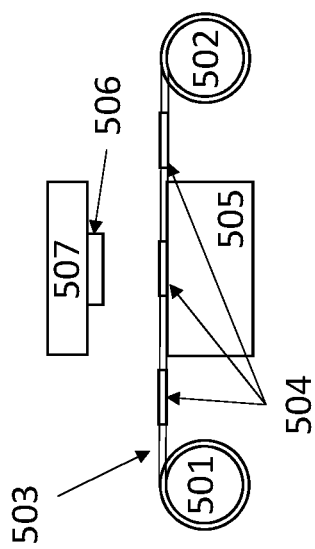

FIG. 5A illustrates an apparatus for staining sections. A roll (501), consisting of a substrate that is a film assembly (503) and captured sections (504), is transferred from an apparatus of section capture such as that described in FIG. 4A. A second roll (502) collects the same assembly as it progresses through processing. At least one fluidic manifold (507) moves relative to a stationary base (505). Each fluidic manifold contains at least one sealing region (506) and connections to separate fluid handling components (not pictured).

Figure 5C:
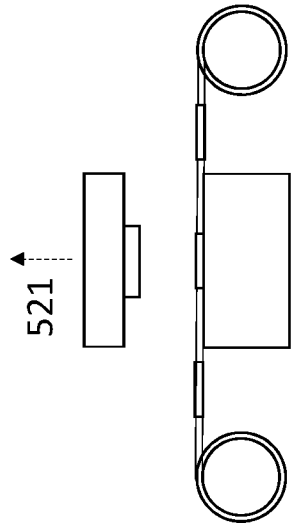

FIGS. 5B-D illustrate the sequence of staining sections using the apparatus of FIG. 5A, in the context of the film assembly described previously in FIGS. 3A-B. A positioner (not pictured) moves the manifold relative to the stationary base (511), such that the sealing region (506) forms a sealing interface with the film assembly's port layer (301) that coincides with a first section. Fluids flow in one or more steps between the manifold and film assembly via the sealing interface. When complete, the positioner separates the manifold, eliminating the sealing interface. Rolls (531, 532) then advance (533) to a next captured section, which may be immediately adjacent to the first section, or at another location along the length of the assembled film.

Figure 6A:
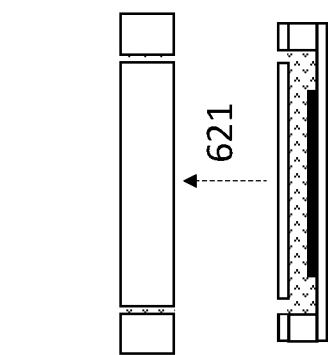
FIGS. 6A-C illustrate an apparatus for staining sections further detailing of a sealing interface and fluid sequence illustrated in FIGS. 5B-5D, according to an embodiment of the invention.
Figure 6B:
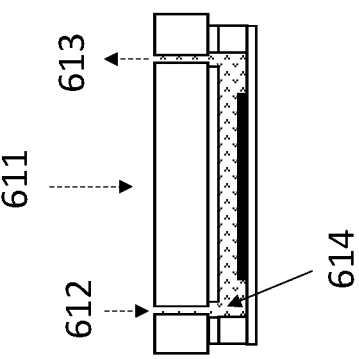
Figure 6C:
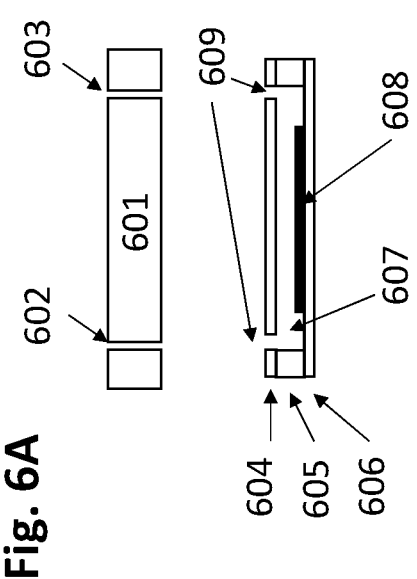

FIGS. 6A-C illustrate an apparatus for staining sections with additional details to the sealing interface and sequence of fluid flow in FIG. 5B-D. As in FIG. 3B-C, the film assembly comprises a port layer (604), spacer layer (605), capture film (606), and section (608) captured in a chamber (607). The manifold (601) contains at least one each of an inlet channel (602) and outlet channel (603), which align with corresponding ports (609) in the port layer. To perform a step of a staining process, the manifold advances (611) and seals against the port layer. Pumps or other flow control apparatus drive a reagent into the inlet channel or channels (612). The reagent then resides in the chamber (614) until a similar step removes it. Fluid, such as excess reagent, reagent from a prior step, or air, exits the outlet channel or channels (613). By separating the manifold and film assembly (621), the apparatus can be used to individually place each captured section in contact with a reagent for an arbitrary length of time.

Figures 7A, 7B:
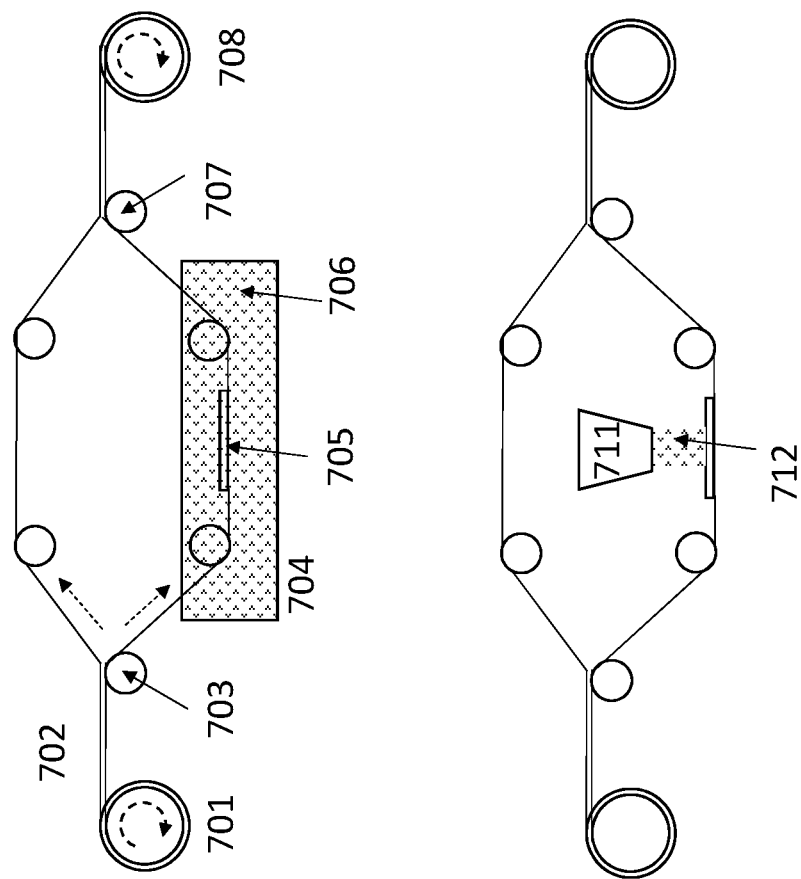
FIGS. 7A-B illustrate another apparatus for staining sections, according to an embodiment of the invention.

FIG. 7A illustrates an alternative means of staining sections. A first roll (701), consisting of a substrate that is a film assembly (702) and captured sections (705), is ultimately directed to a second roll (708). Layers of the film assembly separate near a first roller (703) and ultimately reassemble at a second roller (707). One layer or set of layers submerges in a bath (704) containing reagent (706), such that staining steps are performed while the slice is submerged.

FIG. 7B illustrates a similar step, except that a nozzle (711) deposits the reagent (712) with the use of a bath. The nozzle may be a pipette, spray nozzle, inkjet head, or other device.

Section Imaging

Figure 8C:
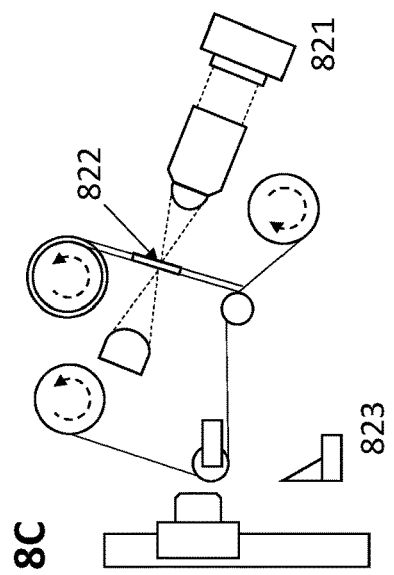
FIGS. 8A-C illustrate an imaging instrument, where
Figure 8B:
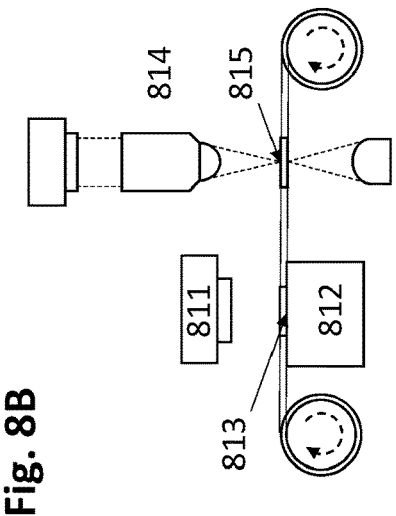
Figure 8A:
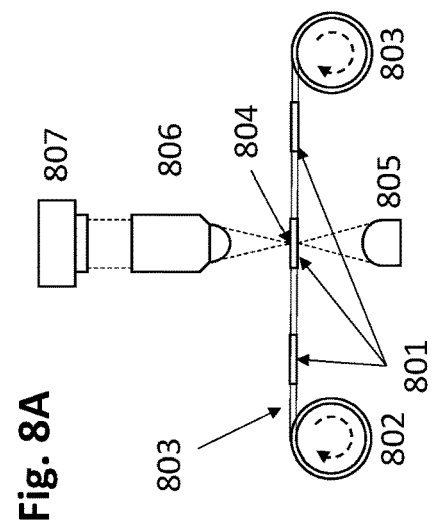

FIG. 8A illustrates an instrument for performing the imaging step of the method described in FIG. 1. Two rolls (802, 803) position the film assembly (803) containing one or more sections (801) into an imaging area (804). Imaging occurs on a dedicated microscope comprising one or more illumination sources (805), one or more lenses (806), a digital camera (807), and positioners to move sections into and out of the microscope's field of view (not pictured). The digital camera is connected, directly or indirectly, to a computer that carries out the decision process (105), such that the decision is based at least partially on output data of the microscope camera.

FIG. 8B illustrates a common apparatus for carrying out both staining and imaging steps. A fluid manifold (811) and base (812) carry out a staining step on one section (813), such as that described in FIGS. 5B-D and FIGS. 6A-C. A microscope (814), resembling that of FIG. 8A, carries out an imaging step on a second section (815). Alternatively, both the apparatus may perform both staining and imaging steps on the same section.

FIG. 8C, in an alternative embodiment, such as that described in FIG. 2, pre-imaging is synchronized with the handling of the substrate. The microscope (821) is attached to a section capture instrument (823), and oriented so as to image a region of the substrate (822) as it passes by.

In an embodiment of the microscope described in FIGS. 8A-C, the camera captures a sequence of two dimensional frames, comprising an entire section or a portion of a section. In an alternative embodiment, the camera scans a line perpendicular to film assembly's direction of travel. In other embodiments, the microscope may make use of alternative imaging modalities, illumination schemes, magnifications, and scanning geometries. For example, the camera may contain light sources and filters that enable switching between brightfield and fluorescent illumination.

One advantage of the method illustrated in FIG. 2 is the ability to use digital images from the pre-imaging step for subsequent processes. The in-line configuration of FIG. 8C, whereby a microscope images the captured sections as they pass on their substrate, is one possible approach to this pre-imaging step. In this case, the microscope may exhibit low magnification (0.25-1.0×) and wide field of view (more than 10 mm), such that a complete section may be represented in a single in-line image. The camera of the microscope may capture a continuous stream of the entire substrate as it passes, or one or more discrete frames for each section. In the latter case, frame capture may be triggered by signals from an optical sensor, position encoder, actuator drive loop, or the image content of previously captured frames.

These in-line images, saved on a local computer or networked storage volume, may then be recalled to select individual sections for the remaining steps of the method of FIG. 2. Alternatively, they may inform the interpretation of later high-magnification imaging steps, for example serving as initial guesses for stitching and 3d registration algorithms.

In-line images may also serve a quality control function for the sectioning apparatus of FIG. 4 or the staining apparatus of FIGS. 5 and 7. A computer algorithm would analyze the contents of one section's in-line images before issuing a signal to process the next section. This quality control function routine, for example, could issue a fault if image information reveals the substrate to be broken or misaligned. In the specific context of the sectioning apparatus, it could be used to fine-tune the speed and acceleration of cutting in response to feedback on sectioning quality of in-line images. Similarly, in the context of staining automation, in-line image feedback could be used to adjust the incubation time, mixing ratio, pressure, and temperature of reagents that interact with individual captured sections.

Substrate Variations

Figure 10B:
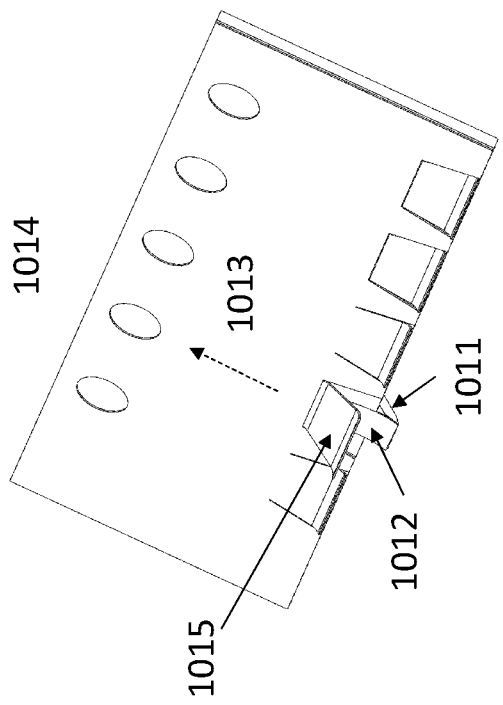
FIGS. 10A-B illustrate a substrate configuration, where
Figure 10A:
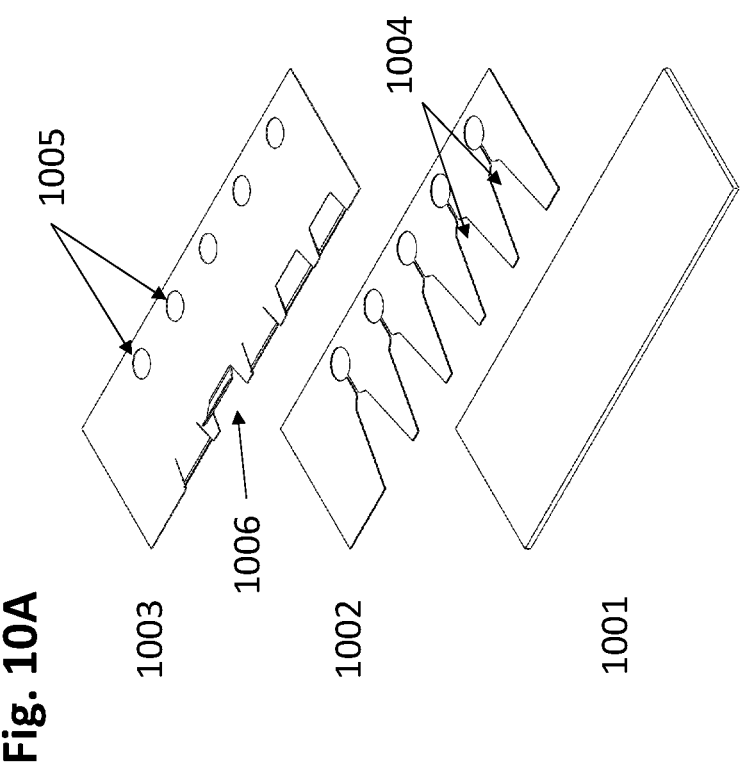

FIGS. 10A-B illustrates an alternative substrate configuration, whereby the substrate comprises base (1001), spacer (1002), and port (1003) layers. Features in the spacer layer define fluid channels (1004) that are accessible by openings in the port layer (1005). Channels are partially accessible to the outside environment via end ports (1006). When a channel is placed near the knife of a cutting apparatus (1011), suction is applied to its corresponding port hole (1014). When the knife cuts a section (1012), suction then draws this slice (1013) into fluid channel. The substrate may also include protruding features (1015) that promote the process of the slice entering the channel.

The base may be rigid, such as a glass slide, or may be a flexible assembly of plastic films. Alternative embodiments of the substrate in FIGS. 10A-B may include: adhesive faces that are fully or partially exposed, material surfaces that promote electrostatic attraction, or drag features to capture sections when propelled by an adjacent stream of gas or liquid.

In many sectioning applications, it is desirable to freeze blocks prior to sectioning. In such cases, the apparatus may operate at a low temperature, and room-temperature adhesion mechanisms may not be automatically suitable. To overcome this, the apparatus may preheat or chemically treat the surface of the block shortly prior to their mutual adhesion. Alternatively, a difference in temperature between two or more of the apparatus, substrate, and specimen may itself promote adhesion between the specimen block and substrate.

For example, the apparatus may inject a liquid, itself above its freezing point, between subfreezing surfaces of the substrate and specimen block shortly before lamination, such that the liquid freezes shortly upon contact. Alternatively, the apparatus may inject a gas that condenses into a liquid, and optionally freezes into a solid, upon contact with these cold surfaces. The condensed or frozen film may then provide temporary or permanent adhesion between the substrate and specimen block.

In certain embodiments, it may be advantageous to apply additional chemical treatment to the frozen section soon after it is captured. The method of the invention may include the application of a liquid-phase encapsulant shortly before or after assembly of the substrate's capture and cover layers.

In certain embodiments, the apparatus may include components and subsystems to regulate the temperature block and substrate, including but not limited to: chilling channels, refrigerated enclosures, Peltier cold plates, temperature sensors, thermostats, temperature regulators, and insulation materials.

Paraffin Melting

Some embedding media, namely paraffin, soften and eventually melt at temperatures as low as 42° C. While the bond between captured tissue and substrate generally remains permanent, it may be desirable to mitigate these temperature effects during the section handling process. This may be achieved by enclosing one or more of the apparatus of FIG. 4-9 in a cooled chamber. Alternatively, one or more of the rolls may be cooled directly, for example by placing the roll in thermal contact with a solid-state chiller or by circulating cooling fluid nearby.

Furthermore, paraffin sectioning quality is known to deteriorate slightly above room temperature. The machinery of this apparatus may locally surpass room temperature. Thus, these techniques may also be used for pre-cooling the block and substrate so as to improve quality.

2.0 Example Scenarios

Cutting-Induced Section Distortion

When analyzing sectioned tissue, it is often beneficial to visualize multiple sections that are mutually aligned to each other. This allows pathologists and researchers to better understand the spatial relationships between histological features.

A common example is an immunohistochemistry (IHC) panel, whereby each section is stained for the expression of a specific marker. Information from aligned IHC sections is often more valuable than the that of individual sections on their own. For example, two distinct IHC markers may be present in a single cluster of cells, leading a pathologist to issue a diagnosis that would not be possible based on information from unaligned sections.

Typically, histology personnel cut sections by manually operating a microtome, floating them on a water bath, and transferring them to glass slides. While this technique is widely trusted, it nonetheless introduces many small mechanical distortions, such as tears and stretches. These distortions cumulatively move features at random at scales of micrometers and hinder the alignment of adjacent sections. Software compensation tools exist, but because each section may be subject to many such random distortions, they are limited in their capability.

Various strategies to automate the histology process still ultimately make use of a water bath, so these distortions similarly hinder alignment. Likewise, the embodiment illustrated in FIG. 10 that makes use of fluid channels has a possibility to introduce distortions that may make high-resolution alignment difficult.

An embodiment illustrated in FIG. 4A laminates a substrate to the exposed face of the tissue block prior to sectioning. The substrate is 10-100 times thicker than the section, making it much more rigid. This mechanically stabilizes the tissue during the cutting process, largely preventing tears. Likewise, stretching distortions are expected to decrease in magnitude and be limited to elastic deformations in the substrate. This benefit would be even more pronounced with a relatively inelastic substrate material, such as Mylar biaxially oriented polyester terephthalate.

Three-Dimensional Representation

Another case where it is beneficial to mutually align multiple sections is in the generation of 3D morphology models. Because this typically requires 100-10,000 slices, cutting-induced distortions would make this nearly impossible with manual sectioning. The established technique for generating 3d models of serial histological sections is knife-edge sectioning microscopy (KESM). This rapidly captures a digital image at the cutting edge of a ultramicrotome blade while sections are sliced from blocks, prior to the onset of most distortions.

But KESM introduces several problems. Tissue blocks need to be pre-stained, so alignment of sections with different marker-specific stains is not possible. It is not possible to remove paraffin or embedding medium before imaging, so these materials may introduce optical defects to images. Cutting and imaging rates must be synchronized, so that images frequently lack the light exposure that is needed for fluorescence and high magnification imaging. Sectioned tissue is discarded immediately after imaging. And practical limitations to the manufacture of knives and microscope components mean that the width of sections is limited.

Pre-laminating a substrate, such as described in this invention, circumvents all of these problems. This decouples the slicing and imaging steps of the method and allows the automation of staining and other preparative steps in between. Imaging of captured sections may occur at the same wide range of exposures and magnifications available to slides prepared manually, but without the labor demands and section deformation. Using this technique, it is then possible to align many sections' images into a 3D model that has higher clarity, resolution, and stain specificity than KESM.

Substrate Clarity

Microscopes, such as those illustrated in FIG. 8, generally benefit from back illumination through their samples. Hence, it is desirable for all layers of the substrates of FIG. 3 to be optically transparent where the section is adhered. It is preferable for the capture film that laminates directly to block faces to be optically transparent, such as DuPont Teflon FEP, transparent PET, and 3M Scotch 600 tapes. Transparency in other layers is achieved by layering adhesive and non-adhesive films that are themselves transparent. Adhesives include silicone and acrylic transfer adhesives, such as 3M 91022 and 9474LE, respectively. Non-adhesive optically clear films include Mylar (PET) and other polyesters, polycarbonate, acrylic, Teflon FEP and PTFE, and cycloolefin polymers and copolymers.

High-Value Stains

Many analytical techniques, including IHC and molecular analysis, require reagents that are extremely expensive Immersing entire segments of substrates, as well as manually prepared slides, in baths of these reagents may be cost-prohibitive for a wide variety of applications. Flow chambers and partitions, for example plastic devices that clip onto slides, are commercially available for such histology applications. But applying these is labor-intensive, they are bulky, and their own material cost may be problematic when analyzing hundreds or thousands of sections.

The substrate design of FIGS. 3B-C mitigates this by defining a flow chamber for every captured section. The chamber geometry is cut into the substrate itself by die cutting or a similar low-cost mass-production technique, so material cost is substantially lower than slide-based devices. The apparatus of FIGS. 5-6 then flows high-cost reagents through these chambers with minimal wasted volume. This, combined with the advantages of automatically selecting only sections of interest for high-cost analysis, vastly improves the utility of such tissue-based techniques. Nonetheless, a staining automation approach that relies on entirely submerging segments of a substrate may be sensible for some applications, particularly common stains for which reagent cost is not a concern.

In an embodiment, an apparatus comprises a processor and is configured to perform any of the foregoing methods.

In an embodiment, one or more non-transitory computer-readable storage media, storing software instructions, which when executed by one or more processors cause performance of any of the foregoing methods.

Note that, although separate embodiments are discussed herein, any combination of embodiments and/or partial embodiments discussed herein may be combined to form further embodiments.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

2.0 Equivalents, Extensions, Alternatives and Miscellaneous

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising:
moving a tissue sample along a path;
adhering a continuous substrate to a face of the tissue sample as the tissue sample is in motion, the tissue sample pulling the adhered continuous substrate along the path as the tissue sample moves along the path;
and moving the tissue sample with the continuous substrate adhered to the face of the tissue sample across a knife edge, wherein a slice of the tissue sample that includes the face of the tissue sample is liberated from the tissue sample by the continuous substrate;
wherein an applicator applies pressure to the continuous substrate to contact the face of the tissue sample.

2. The method of claim 1, wherein the continuous substrate is dispensed from a feed roll.

3. The method of claim 1, wherein the continuous substrate is dispensed from a feed roll, and wherein rotational speed of the feed roll is regulated.

4. The method of claim 1, wherein the knife is included in a microtome.

5. The method of claim 1, further comprising:
attaching a protective film to a second face of the slice that is opposite to a first face of the slice adhered to the continuous substrate.

6. The method of claim 1, further comprising:
attaching a protective film to a second face of the slice that is opposite to a first face of the slice adhered to the continuous substrate;
removing the protective film prior to staining the slice.

7. The method of claim 1, further comprising:
attaching a protective film to a second face of the slice that is opposite to a first face of the slice adhered to the continuous substrate;
removing the protective film prior to staining the slice;
reattaching the protective film to the second face of the slice after the slice has been stained.

8. The method of claim 1, further comprising:
imaging the slice adhered to the continuous substrate.

9. The method of claim 1, further comprising:
attaching a protective film to a second face of the slice that is opposite to a first face of the slice adhered to the continuous substrate;
removing the protective film prior to staining the slice;
reattaching the protective film to the second face of the slice after the slice has been stained;
imaging the stained slice on the continuous substrate.

10. The method of claim 1, further comprising:
attaching a protective film to a second face of the slice that is opposite to a first face of the slice adhered to the continuous substrate;
removing the protective film prior to staining the slice;
attaching a second protective film to the second face of the slice after the slice has been stained.

11. The method of claim 1, further comprising:
attaching a protective film to a second face of the slice that is opposite to a first face of the slice adhered to the continuous substrate;
removing the protective film prior to staining the slice;
attaching a second protective film to the second face of the slice after the slice has been stained;
imaging the stained slice on the continuous substrate.

* * * * *